Figure 1:
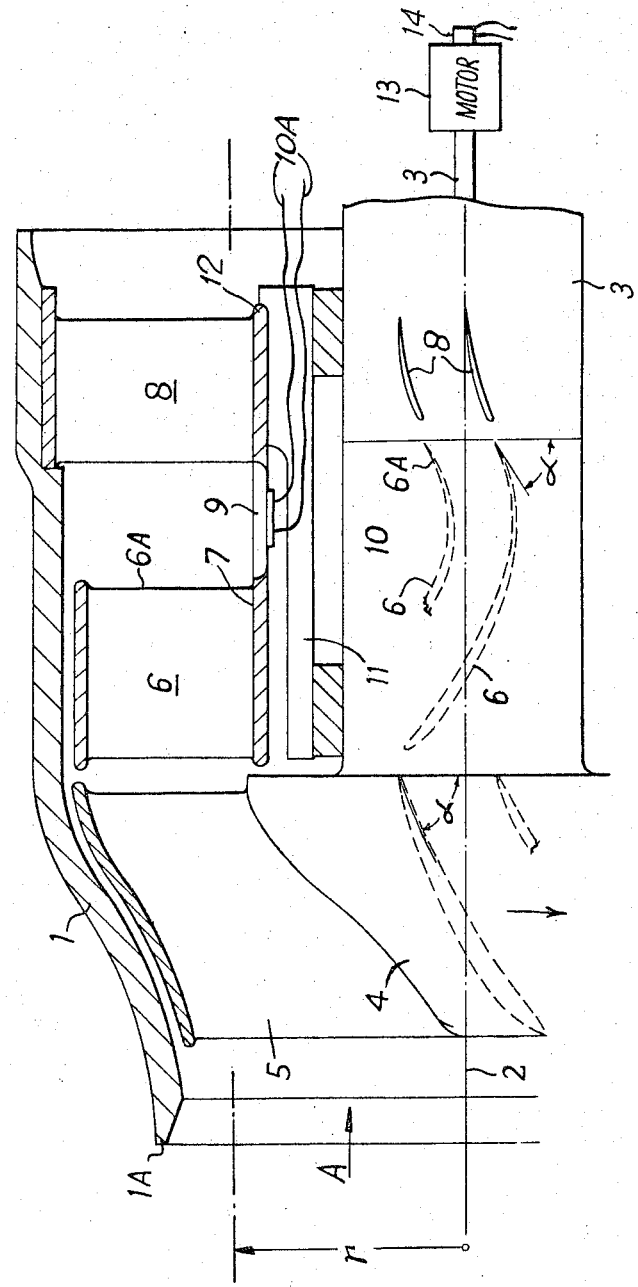

Nov. 21, 1967  N. MOSS  3,353,406
MASS-FLOW DETERMINING DEVICES
Filed Feb. 10, 1965  2 Sheets-Sheet 1

United States Patent Office 3,353,406
Patented Nov. 21, 1967

3,353,406
MASS-FLOW DETERMINING DEVICES
Norman Moss, Ilford, England, assignor to Plessey-UK Limited, Ilford, England, a British company
Filed Feb. 10, 1965, Ser. No. 431,629
Claims priority, application Great Britain, Feb. 21, 1964, 7,356/64
2 Claims. (Cl. 73—194)

The present invention relates to mass-flow determining devices for liquids and other fluids and has for an object to provide an improved mass-flow determining devide of the hydrodynamic kind which, in addition to determining the mass flow, also produces an increase in pressure and/or flow velocity so that the device may be used as a combined pumping and mass-flow metering unit. For this purpose a mass flow meter according to the present invention comprises a power-driven bladed rotor member and a bladed torque-measuring reactor member resiliently restrained from rotation through which the outlet flow from the rotor is passed, and the outlet angles of the respective blades of the rotor and of the torque-measuring reactor member being so related that when flow is passed through the rotor and torque-measuring reactor members with the rotor held stationary, the flow will exert no torque upon the reactor member. In the case of a constant-radius axial-flow pump this requirement is fulfilled if the outlet angles of the blades of the torque-measuring reactor member are equal to the outlet angles of the rotor blades, provided that the total thickness of the blades at their outlet ends is also equal to the total thickness of the blades at their inlet ends, since in this case the tangential momentum of the liquid leaving the rotor and entering the torque-measuring reactor member is equal to the tangential momentum of the liquid leaving the torque measuring reactor member, irrespective of the absolute value of the flow velocity. In the case of a centrifugal pump, or generally in cases in which the mean radial distance from the axis of the passage at the outlet end of the torque-measuring member differs from the corresponding value at the outlet end of the rotor, the angles must be different for obvious reasons, in order to achieve absence of torque upon the torque-measuring member when the rotor is held stationary. In each case the determination of the mass flow is based on the fact that the torque of a flow-deflection member about an axis is proportional to the product of the mass flow and the difference of the tangential flow velocities at the inlet and outlet respectively, multiplied with the mean radius if inlet and outlet take place at the same radius. If the inlet and outlet of the torque-measuring member have different mean radial distances from the axis of the duct, the tangential components of the inlet and outlet speeds must be reduced to a common radius; and since in each case the difference between the inlet and outlet speeds of the torque-measuring member is equal to the circumferential speed of the rotor, when all tangential speeds are reduced to a common radial distance from the rotor axis, the mass flow is equal to the measured torque divided by the product of the said radial distance and the circumferential speed of the rotor at the said radial distance from the axis. Therefore if the pump rotor always rotates at a constant speed, the mass flow is directly proportional to the measured torque while in the case of a pump driven at variable speed the mass flow is proportional to the quotient of the torque divided by the rotor speed. Means must therefore be incorporated in the latter case for evaluating the rotor speed.

Figure 2:
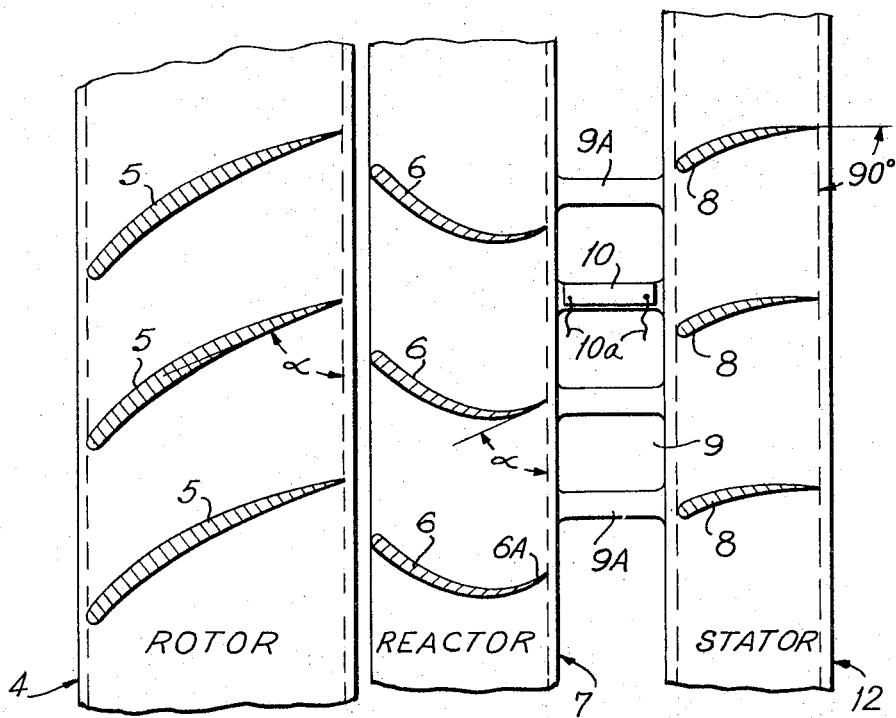

In the accompanying drawing:
FIGURE 1 is a diagrammatic elevation, mainly in section, of one embodiment of the invention, and FIGURE 2 is a developed section along a cylinder of radius $r$ about the axis of the embodiment.

Referring now to the drawing, a suitable duct section 1, which is of circular cross-section about a rectilinear axis 2, contains a rotor shaft 3 which is drivingly connected to a motor 13 and is arranged coaxially in the duct, a rotor-speed ascertaining means being illustrated as a generator 14. At its end facing the inlet 1A of the duct 1, the shaft 3 carries a rotor in the form of an impeller wheel or rotor 4 which has impeller blades 5 so arranged that the impeller will produce a flow along the duct in the direction of the arrow A when the shaft is driven in a predetermined forward direction of rotation. The blades 5 end in a common radial plane at right angles to the axis 2, and the end portion of each individual blade forms an angle $\alpha$ with this plane. The torque-determining reactor member comprises a set of blades 6 mounted on a body 7 which has the form of a thin-walled tube which carries the reactor blades 6 near one of its ends and is aligned with a further tubular body 12, hereinafter referred to as starter, which latter is secured in the body of the duct section 1 by struts 8 of streamlined cross-section. The tubular body 7 is connected to the stator 12 by integral strips 9A separated by longitudinal slots 9 to provide resilient torsional yield of the stator, and a variable-resistance type of electric strain gauge 10, whose electric leads are shown at 10A is applied between the tubular bodies 7 and 12 to measure the amount of torque applied by the blades 6. Similarly to the blades 4 of the impeller, the reactor blades 6 are so shaped as to terminate in a common plane perpendicular to the axis 2, with which the end portion of each blade forms an angle $\alpha$ equal to the angles formed between the outlet end of each rotor blade 4 and a plane perpendicular to the axis 2. In FIGURE 1, in order to show this angle $\alpha$ more clearly, those blades 6 which appear approximately symmetrically to the axis 2 in the illustraiton, have been shown of exaggerated length.

It should be borne in mind that from the point of view of torque measurement only the angles $\alpha$ at the outlet end of each of the sets of blades 4 and 6 are relevant, so that the angles of the blades 4 and 6 at the respective inlet ends of the blades can be so chosen as to obtain optimum pumping action. In addition a set of diffuser blades are shown arranged downstream of the torque-measuring reactor blades 6 to improve the efficiency of the pump by utilising the swirl component of the flow leaving the rotor 6, which swirl component has to be provided in order to obtain equality of the angles $\alpha$ at the outlets of the stator and rotor blades respectively. For convenience these diffuser blades have, in the illustrated embodiment, been formed integral with the struts 8 by suitably profiling these struts as diagrammatically indicated in the drawing.

Conveniently, the struts 8, are also, as illustrated, utilised to hold a bearing structure 11 which serves to support the shaft 3 in the vicinity of the impeller 4.

The apparatus according to the present invention offers, compared with known dynamic flow meters, the advantage of avoiding in many cases the hitherto existing need of providing, in addition to the flow meter, a pump for the liquid; at the same time it permits the production of a substantial torque reactor and is therefore conducive to a robust construction of the meter since, due to the utilisation of the device as a pump, the energy necessary for providing the torque is not dissipated as heat but utilised for producing the pumping effect.

What I claim is:
1. A combined pump and mass-flow meter, comprising a power-driven bladed rotor member having an inlet and outlet, and a bladed torque-ascertaining reactor member resiliently restrained from rotation and also having an inlet and an outlet, and means for guiding a flow of fluid through said rotor member from the inlet to the outlet thereof and thence through the reactor member from the inlet to the outlet thereof, wherein the outlet ends of the blades of the reactor member are set at an angle with reference to the flow axis different from the angle of the inlet ends, the respective inlet and outlet angles of the blades of the rotor and reactor members being so determined that when the rotor member is driven and fluid is allowed to flow through the rotor and reactor members, the said angles of the blades of the reactor member as well as their curvature cause a substantial portion of the driving power applied to the rotor member to be employed to increase the total pressure of the fluid leaving the reactor member over the total pressure of the fluid entering the rotor member, the outlet angles of the respective blades of the rotor member and reactor member being so related that when fluid is passed through the rotor and reactor member with the rotor held stationary, the flow of fluid will exert no torque upon the reactor member.

2. A combined pump and mass-flow meter as claimed in claim 1 for use with variable rotor speed, which incorporates means for evaluating the rotor speed.

References Cited

UNITED STATES PATENTS 3,060,736   10/1962   Maze _____ 73—194

JAMES J. GILL, *Acting Primary Examiner.*

RICHARD C. QUEISSER, *Examiner.*

E. D. GILHOOLY, *Assistant Examiner.*